(12) United States Patent
Fuchs

(10) Patent No.: US 9,110,986 B2
(45) Date of Patent: Aug. 18, 2015

(54) SYSTEM AND METHOD FOR USING A COMBINATION OF SEMANTIC AND STATISTICAL PROCESSING OF INPUT STRINGS OR OTHER DATA CONTENT

(75) Inventor: Gil Fuchs, Nes Tsiona (IL)

(73) Assignee: VEXIGO, LTD., Nes Ziona (IL)

( * ) Notice: Subject to any disclaimer, the term of this patent is extended or adjusted under 35 U.S.C. 154(b) by 1209 days.

(21) Appl. No.: 13/019,213

(22) Filed: Feb. 1, 2011

(65) Prior Publication Data

US 2012/0197936 A1      Aug. 2, 2012

Related U.S. Application Data

(60) Provisional application No. 61/438,128, filed on Jan. 31, 2011.

(51) Int. Cl.
G06F 17/30 (2006.01)
(52) U.S. Cl.
CPC ................ *G06F 17/30734* (2013.01)
(58) Field of Classification Search
USPC ............... 707/706–711, 713–732, 735–739, 707/748–755, 758, 759, 762–775, 779–783, 707/791–796, 800, 804
See application file for complete search history.

(56) References Cited

U.S. PATENT DOCUMENTS

| 8,166,051 | B1 * | 4/2012 | Bauer et al. | 707/750 |
|---|---|---|---|---|
| 2007/0043761 | A1 * | 2/2007 | Chim et al. | 707/102 |
| 2007/0298821 | A1 * | 12/2007 | Bush | 455/507 |
| 2008/0052078 | A1 * | 2/2008 | Bennett | 704/257 |
| 2010/0278428 | A1 * | 11/2010 | Terao et al. | 382/177 |
| 2011/0219004 | A1 * | 9/2011 | Jin | 707/740 |

* cited by examiner

*Primary Examiner* — Khanh Pham
*Assistant Examiner* — Reza Hosseini
(74) *Attorney, Agent, or Firm* — Soroker-Agmon

(57) ABSTRACT

A system and method for using a combination of semantic and statistical processing of input strings or other data content, such as a web page or an electronic document. In accordance with an embodiment, the system enables the injection of semantics into an otherwise statistically-based environment, by recognizing that, within various topics, certain words, combinations of words, or phrases, herein referred to as keyphrases have different weights. Some keyphrases may be relatively unique within a particular topic, or have a relatively high weighting towards that topic; whereas other keyphrases may not be unique, or may have a relatively low rating toward that topic. In accordance with an embodiment, the system allows for characterization of both (a) "sufficient" and (b) "necessary" keyphrases. A keyphrase is considered sufficient for a particular topic when, if that keyphrase is found in the input string or data content, one is likely to be in that topic (but could be in another topic). A keyphrase is considered necessary for a particular topic when, if that keyphrase is found in the input string or data content, one is both very likely to be in that topic, and very unlikely to be in any other topic. This information can be used as part of the input processing.

16 Claims, 5 Drawing Sheets

SYSTEM AND METHOD FOR USING A COMBINATION OF SEMANTIC AND STATISTICAL PROCESSING OF INPUT STRINGS OR OTHER DATA CONTENT

CLAIM OF PRIORITY

This application claims the benefit of priority to U.S. Provisional patent application titled "SYSTEM AND METHOD FOR USING A COMBINATION OF SEMANTIC AND STATISTICAL PROCESSING OF INPUT STRINGS OR OTHER DATA CONTENT"; Application No. 61/438,128; filed Jan. 31, 2011, which is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to data processing and searching, and are particularly related to a system and method for using a combination of semantic and statistical processing of input strings or other data content.

BACKGROUND

Several approaches have been developed for computationally processing and responding to a human input, such as might be provided by a user to a web-based search service, or to an interface of an expert system. These approaches can be considered either semantic or statistical in nature.

For example, if one considers a typical sentence, such as "Smith hit the basket every time", this sentence can be analyzed using a semantic approach by considering the meaning and relationship of the various words within the sentence. However, although this approach may seem intuitive to a human, and can provide accurate results, such approach is relatively computationally expensive to implement.

Alternatively, the sentence can be analyzed using a statistical approach by considering the occurrence of each word in the sentence, and, using a reference information culled from previous analysis of perhaps thousands of documents on various topics, compare the occurrence of the words within the sentence with weighted entries in that reference information. However, although the statistical approach is relatively computationally inexpensive to implement (through the use of lookups etc.), it typically is not as accurate as the semantic approach, and has a tendency to generate more false positives, such as incorrectly determining that a particular sentence pertains to a particular topic.

For example, in the above sentence, the word "basket" can pertain to the topic of basketball, or the topic of arts and crafts, and, while a semantic approach may successfully tackle such a sentence, a statistical approach may not satisfactorily resolve the topic, which in turn can lead to undesired results. This is the general area that embodiments of the invention are intended to address.

SUMMARY

Disclosed herein is a system and method for using a combination of semantic and statistical processing of input strings or other data content, such as a web page or an electronic document. In accordance with an embodiment, the system enables the injection of semantics into an otherwise statistically-based environment, by recognizing that, within various topics, certain words, combinations of words, or phrases, herein referred to as keyphrases have different weights. Some keyphrases may be relatively unique within a particular topic, or have a relatively high weighting towards that topic; whereas other keyphrases may not be unique, or may have a relatively low rating toward that topic. In accordance with an embodiment, the system allows for characterization of both (a) "sufficient" and (b) "necessary" keyphrases. A keyphrase is considered sufficient for a particular topic when, if that keyphrase is found in the input string or data content, one is likely to be in that topic (but could be in another topic). A keyphrase is considered necessary for a particular topic when, if that keyphrase is found in the input string or data content, one is both very likely to be in that topic, and very unlikely to be in any other topic. This information can be used as part of the input processing.

DETAILED DESCRIPTION

As described above, both the semantic approach and the statistical approach for computationally processing and responding to a human input suffer from in inherent disadvantages. Although the semantic approach may seem intuitive to a human, and can provide accurate results, such approach is relatively computationally expensive to implement. In contrast, although the statistical approach is relatively computationally inexpensive to implement, it typically is not as accurate as the semantic approach, and has a tendency to generate more false positives.

To address this, described herein is a system and method for using a combination of semantic and statistical processing of input strings or other data content, such as a web page or an electronic document. In accordance with an embodiment, the system enables the injection of semantics into an otherwise statistically-based environment, by recognizing that, within various topics, certain words, combinations of words, or phrases, herein referred to as keyphrases have different weights. Some keyphrases may be relatively unique within a particular topic, or have a relatively high weighting towards that topic; whereas other keyphrases may not be unique, or may have a relatively low rating toward that topic.

In accordance with an embodiment, the system allows for characterization of both (a) "sufficient" and (b) "necessary"

keyphrases. A keyphrase is considered sufficient for a particular topic when, if that keyphrase is found in the input string or data content, one is likely to be in that topic (but could be in another topic). As described below, this need not be simply a Boolean (on/off) determination, but can include some degree of flexibility. Necessary keyphrases are a subset of sufficient keyphrases. A keyphrase is considered necessary for a particular topic when, if that keyphrase is found in the input string or data content, one is both very likely to be in that topic, and very unlikely to be in any other topic. Accordingly, necessary keyphrases are more precious from the aspect of resolving a particular input string or data content against a plurality of potential topics.

Turning to the basketball analogy above, the word or phrase "rebound" would be considered relevant to the topic of basketball, but "rebound" can also be used in other topics, so this word or phrase would be considered sufficient for the topic of basketball. However the word or phrase "good percentage rebound" would probably be considered relevant only to the topic of basketball, so this word or phrase would be considered necessary for the topic of basketball. It will be seen that, although a keyphrase can be a word, combination of words, or phrase, complex multi-word phrases have much higher probability than simple phrases or single words of being necessary for a particular topic.

Figure 1:
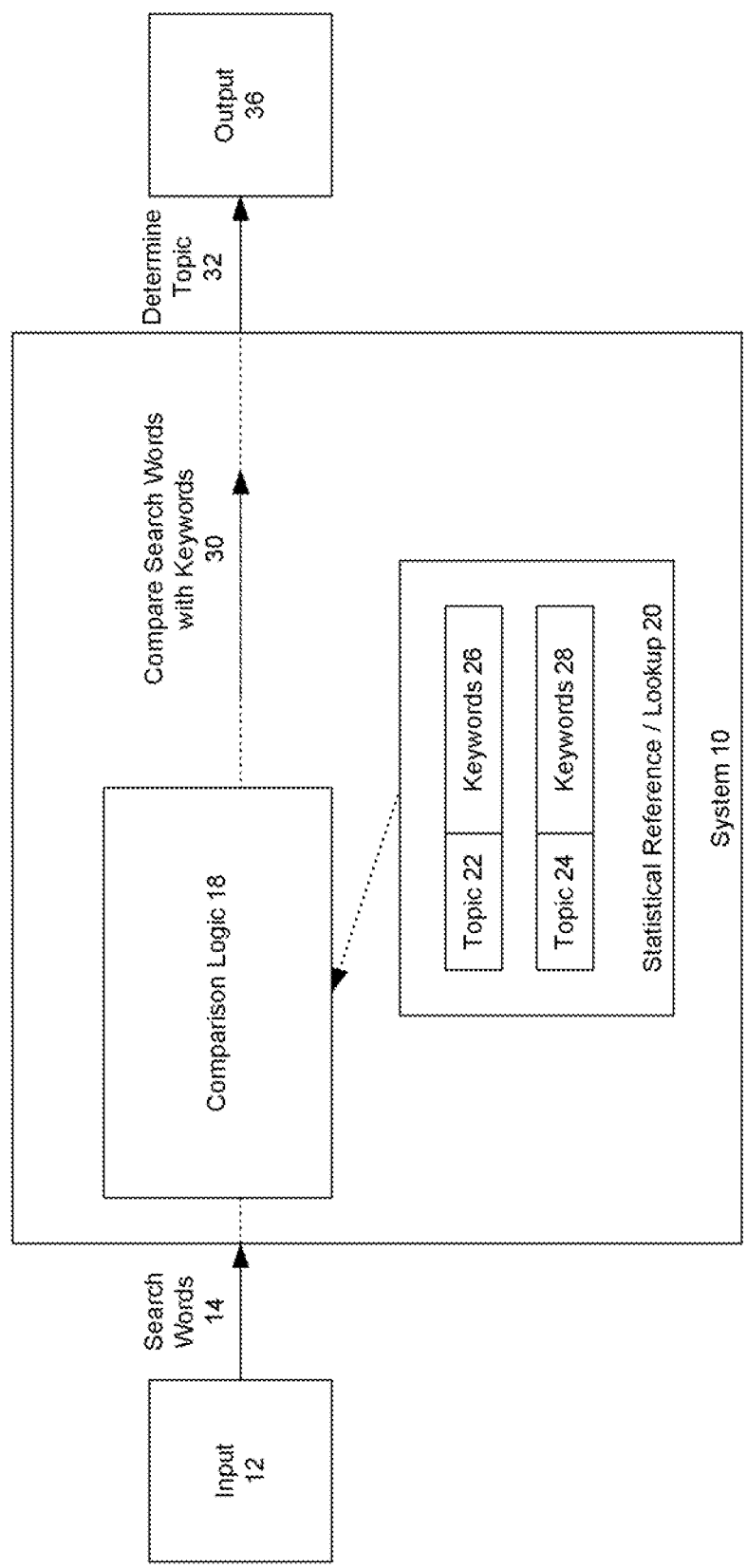
FIG. 1 shows a system for receiving an input and providing an output, in accordance with the prior art.

FIG. 1 shows a system for receiving an input and providing an output, in accordance with the prior art. As shown in FIG. 1, in a system that uses a statistical approach to processing input or data content, the system receives an input 12, which can be in the form of a user-entered search query, a set of text retrieved by an automated robot process, a web page, electronic document, or some other form of input. For example, continuing the basketball analogy, the input might include the sentence "Smith hit the basket every time", which contains one or more searchable words, including the word "basket". The system includes a comparison logic 18, and a statistical reference/lookup 20 culled from previous analysis of perhaps thousands of documents on various topics, which the comparison logic uses to analyze the sentence by considering the occurrence of each word (e.g. "basket") in the input sentence, and comparing those occurrences with weighted entries in the statistical reference/lookup. In some embodiments, the statistical reference/lookup may include a series of topics 22, 24, and sets of keywords 26, 28 that are commonly associated with those topics, which are then used by the comparison logic to perform a statistical comparison of the search words in the input 30, determine an appropriate topic 32, and generate an appropriate output 36.

As described above, although such a statistical approach is relatively computationally inexpensive to implement, it typically is not as accurate as a semantic approach, and has a tendency to generate more false positives.

Figure 2:
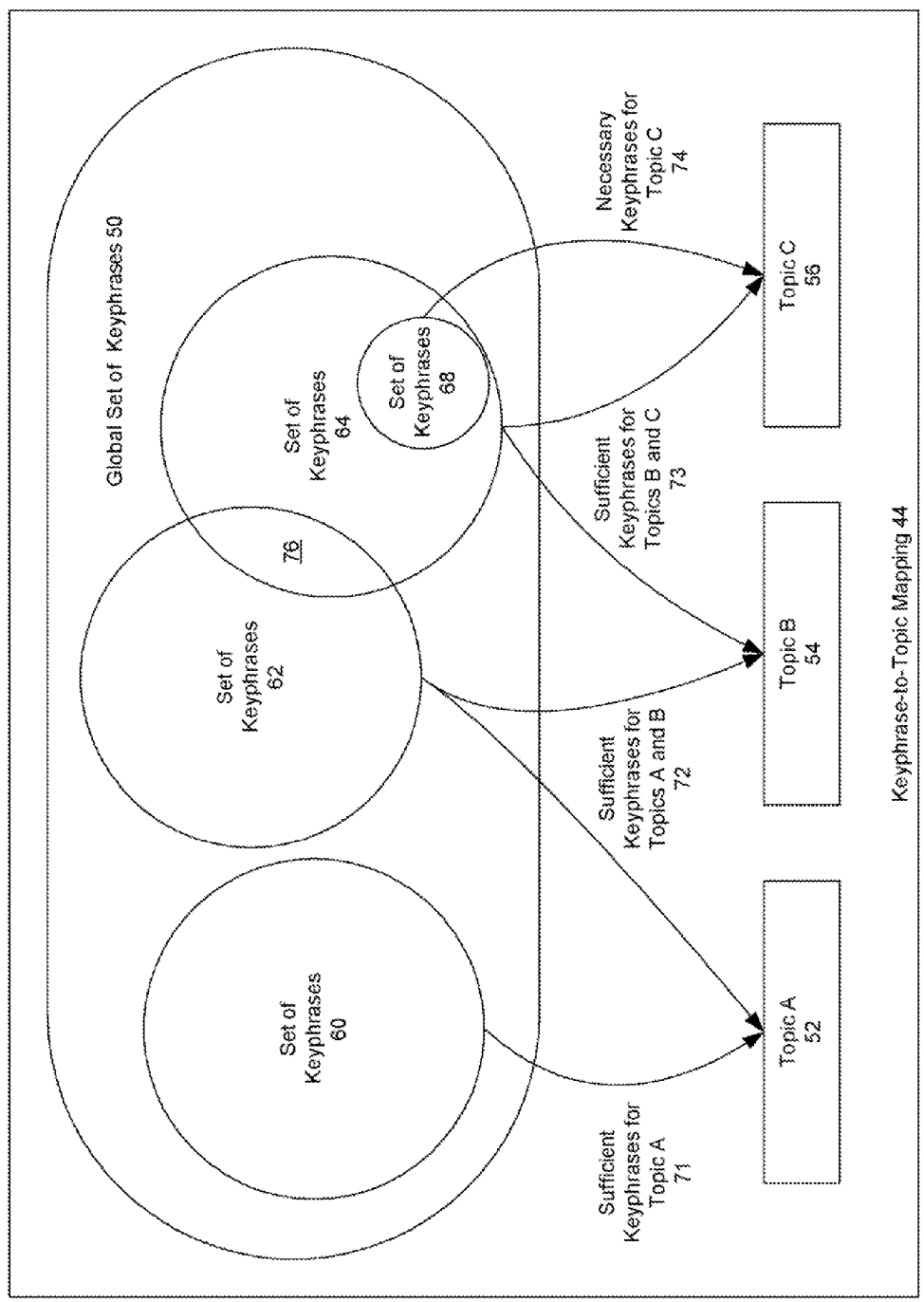
FIG. 2 illustrates the use of sufficient and necessary keyphrases, in accordance with an embodiment.

FIG. 2 illustrates the use of sufficient and necessary keyphrases, in accordance with an embodiment. As shown in FIG. 2, a keyphrase-to-topic mapping 44 is used to semantically map keyphrases within a global set of keyphrases 50, to a plurality of topics 52, 54, 56. Some sets of keyphrases can be considered sufficient for a particular topic. For example, as shown in FIG. 2, the set of keyphrases 60 is considered sufficient 71 for topic A. A keyphrase is considered sufficient when, without that keyphrase in the input string or data content, one is probably not in a particular topic. Some sets of keyphrases can be considered sufficient for more than one topic. For example, as shown in FIG. 2, the set of keyphrases 62 is considered sufficient 72 for topics A and B; while the set of keyphrases 64 is considered sufficient 73 for topics B and C. Necessary keyphrases are a subset of sufficient keyphrases.

A keyphrase is considered necessary if that keyphrase has very little likelihood of leading to any other topic. For example, as shown in FIG. 2, the set of keyphrases 68, which is a subset of the set of keyphrases 64, is considered necessary 74 for topic C. This information can be used as part of the input processing, by replacing (or optionally supplementing) a statistical reference/lookup.

FIG. 2 also illustrates that keyphrases can have a relatively higher or lower "entropy". In accordance with an embodiment, the fewer topics a particular keyphrase can participate in, the lower the entropy of that keyphrase, and vice versa. For example, as shown in FIG. 2, the keyphrases unique to set 60 relate to a single topic A, so these keyphrases have a relatively lower entropy than the keyphrases unique to set 62 which relate to two topics A and B. Keyphrases which are sufficient for many topics (e.g. those in portion 76) have a very high entropy. Conversely, keyphrases that are necessary for a particular topic (e.g. set 64) have a very low entropy. For example, again using the basketball analogy, the word "referee" is generally used in a small variety of (mostly sports-related) topics, so "referee" has a relatively lower entropy. This information can also be used as part of the input processing.

Figure 3:
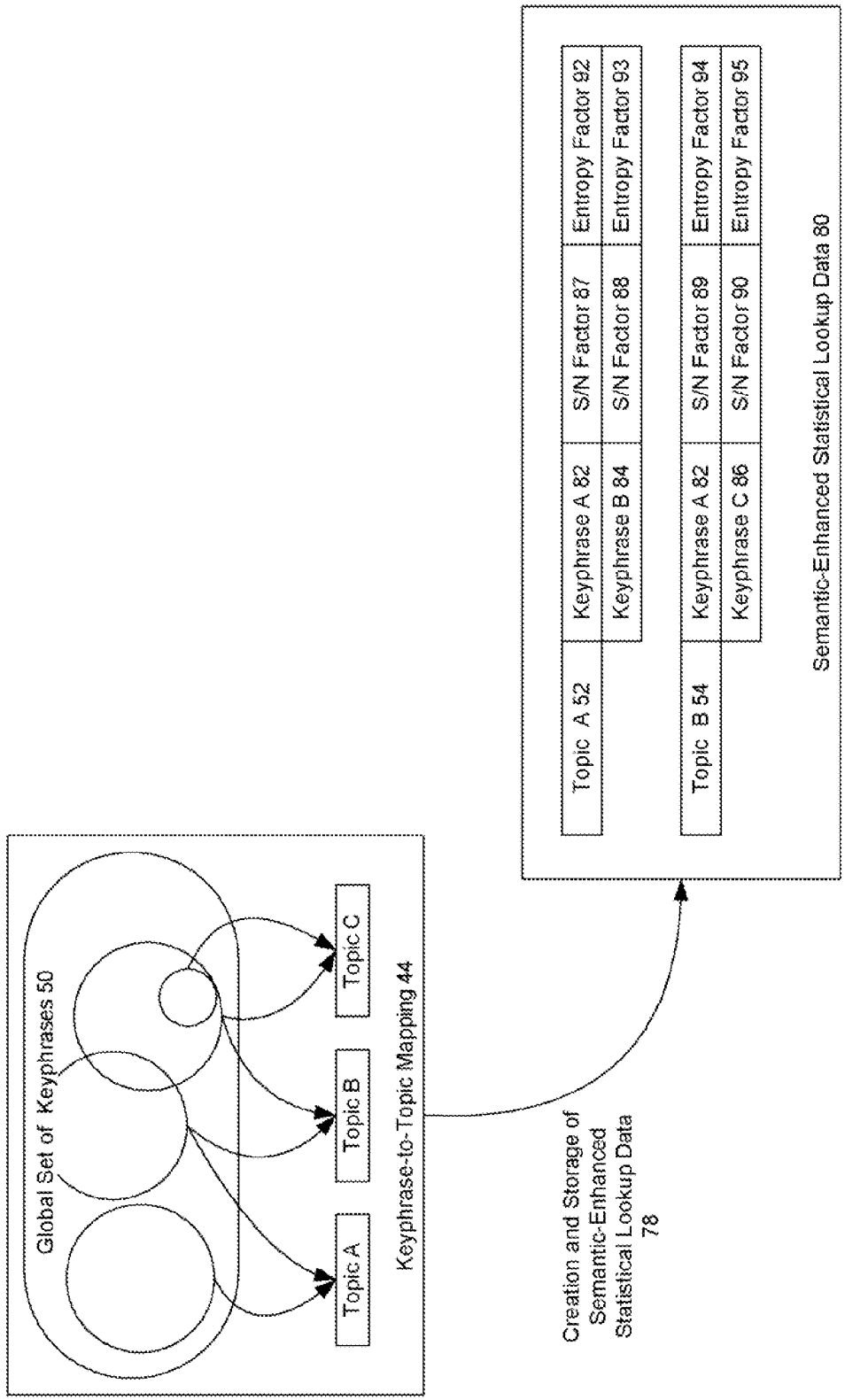
FIG. 3 illustrates the creation of a semantically-enhanced statistical lookup data, which can be used by the system, in accordance with an embodiment.

FIG. 3 illustrates the creation of a semantically-enhanced statistical lookup data, which can be used by the system, in accordance with an embodiment. As shown in FIG. 3, the information in the keyphrase-to-topic mapping 44 is converted to and/or stored 78 as a computer-readable semantically-enhanced statistical lookup data 80. In accordance with an embodiment, the semantically-enhanced statistical lookup data includes a plurality of entries, including for each of a plurality of topics 52, 54, a plurality of keyphrases 82, 84, 86 associated with that topic, together with an indication or factor as to whether that keyphrase is sufficient (S) or necessary (N) 87, 88, 89, 90, and optionally an indication or factor as to the keyphrases entropy 92, 93, 94, 95. In accordance with an embodiment, the S/N and entropy factors can be simple Boolean (on/off) values. Alternatively, the factors can include a weighting or a scaled value between e.g. 0 and 1 for each topic, and the system can be configured to understand that particular values are indicative of the phrase being, e.g. sufficient, necessary, or of higher or lower entropy, etc.

Figure 4:
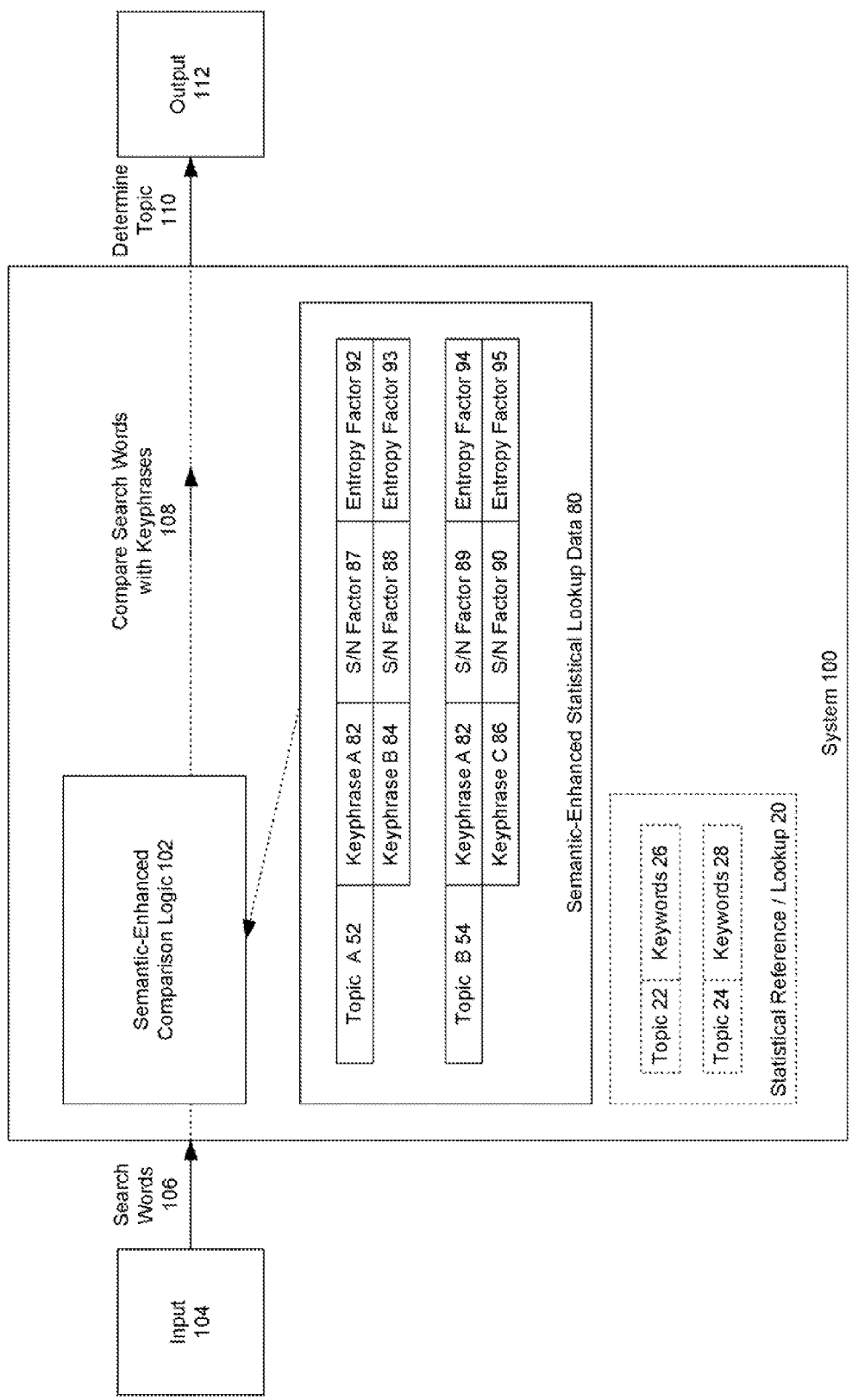
FIG. 4 shows an illustration of a system that uses a combination of semantic and statistical processing of input or data content, in accordance with an embodiment.

FIG. 4 shows an illustration of a system that uses a combination of semantic and statistical processing of input or data content, in accordance with an embodiment. As shown in FIG. 4, the system 100 again receives an input 104, which can again be in the form of a user-entered search query, a set of text retrieved by an automated robot process, a web page, electronic document or some other form of input. In accordance with an embodiment, the system includes a semantically-enhanced comparison logic 102, and the semantically-enhanced statistical lookup data created as described above, which can replace (or optionally supplement) any statistical reference/lookup, and which the semantically-enhanced comparison logic uses to analyze the input, compare search words in the input with keyphrases 108, determine an appropriate topic 110, and generate an appropriate output 112. In accordance with various embodiments and implementations, the system can include or use equations or algorithms that take into account factors such: as the occurrence of words and/or phrases in an input, the strength or affinity of a word or phrase for a particular topic model, the entropy of the word or phrase across different topic models, or whether the word or phrase is necessary or sufficient to determine a confidence coefficient, as part of the input processing.

In accordance with an embodiment, an example equation or algorithm, which can be used with an input containing a plurality of words potentially spanning one or more topics, can be expressed as:

```
for_each_word_in_input do {
    for_each_topic do {
        Σ (all words in input) (incidence of word in input)
            x (coefficient of word for model)
                x (entropy of word)
                    x (s/n factor)
    } }
``` wherein the above algorithm calculates an indication for the input, for a particular model, by determining a product of the incidence of each word (e.g. the number of times that word appears in the input), times the coefficient of that word for the particular model (e.g. a measure of whether the word is a strong or non-strong indicator for the particular model), times the entropy of the word (e.g. whether the word is sufficient for many topics, and if so to what extent), times the sufficiency/necessary (s/n) factor for the word for the particular model.

In accordance with other embodiments, different equations or algorithms can be used depending on the implementation, type of input (e.g. search string, web page, or electronic document), or desired response, result, or action.

Figure 5:
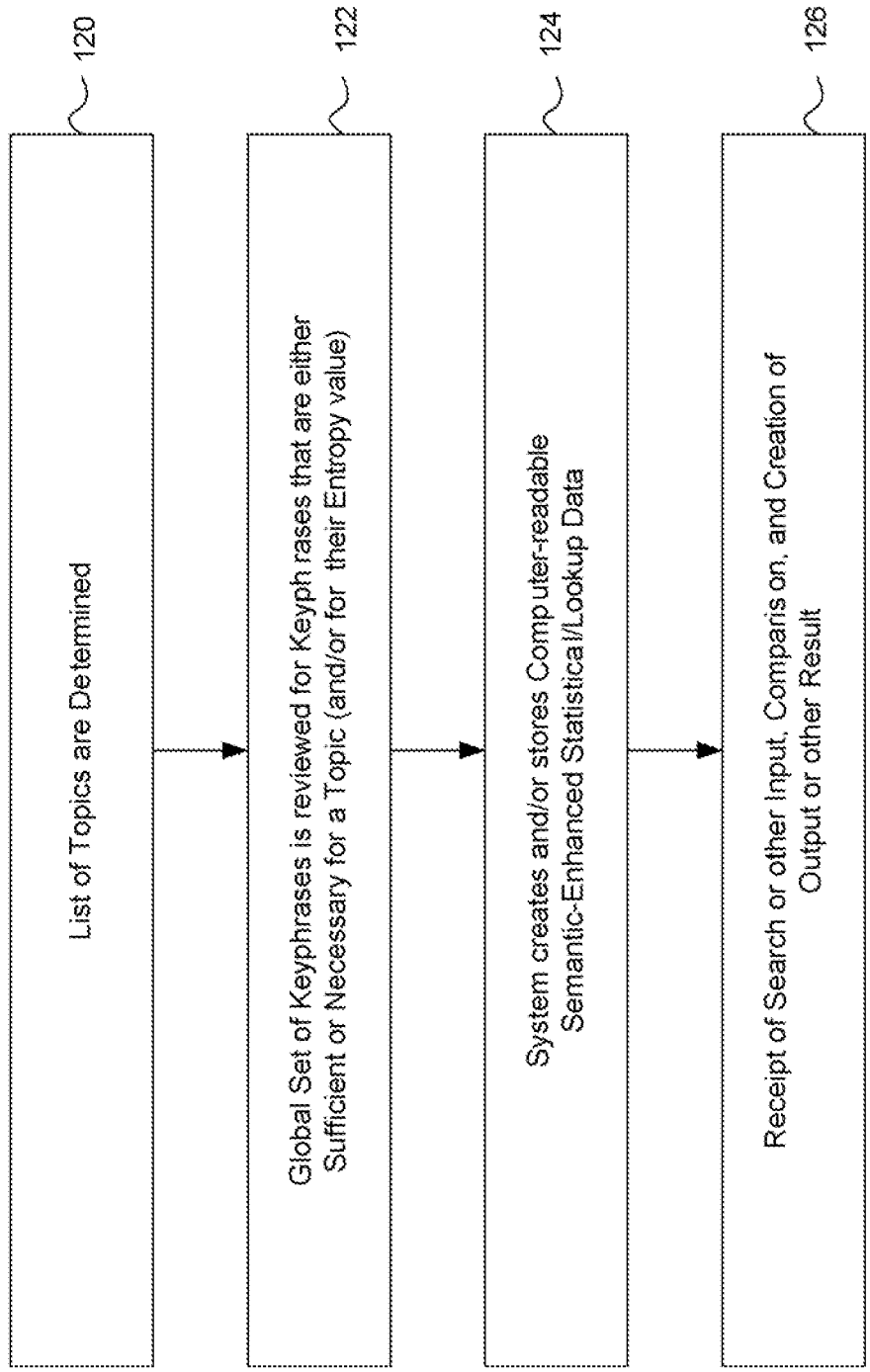
FIG. 5 shows a flowchart of a method of using a combination of semantic and statistical processing of input or data content, in accordance with an embodiment.

FIG. 5 shows a flowchart of a method of using a combination of semantic and statistical processing of input or data content, in accordance with an embodiment. As shown in FIG. 5, in step 120, a list of topics are determined. In step 122, a global set of keyphrases is reviewed for keyphrases that are either sufficient or necessary for a topic (and/or for their entropy value). In step 124, the system creates and/or stores a computer-readable semantically-enhanced statistical/lookup data. In step 126, the system receives a search or other input, performs a comparison of search words in the input with keyphrases in the semantically-enhanced statistical lookup data, and creates an output or other result.

Using the above approach, the system enables the injection of semantics into an otherwise statistically-based environment, and can be provided as a completely new system, or as an add-on to an existing system. In practice, the system can be initially configured by a person or team of persons, who can perform the initial association of sufficient and necessary keyphrases, and/or values therefor with particular words, combinations of words, or phrases for particular topics (e.g., determining whether the word "hoop" is related to the topic of basketball and/or other topics, and whether it is sufficient, necessary, or has a high or low entropy). Values for entropy can also be derived from previous data sets, and used to guide the initial configuration process. Then, at runtime, since the system uses a computer-readable semantically-enhanced statistical/lookup data, the approach provides more accurate input processing, with little or no increase in actual runtime computational requirements. Various embodiments can be used for, e.g. input searching/matching, such as Web-based search services; filtering of undesirable content; interfaces to expert system; or any other application in which high-quality data matching is desired.

Typical Use Cases

As described above, in accordance with various embodiments, the system can be used for, e.g. input searching/matching, such as Web-based search services; filtering of undesirable content; interfaces to expert system; or any other application in which high-quality data matching is desired.

For example, when used as part of a content classification system, the system can utilize a model for each particular topic that takes into account the relative strength of a word, phrase or other data content within that particular topic. Words or phrases are not necessarily equally sufficient or necessary within any one topic. For example, in the topic of psychology, the words or phrases "shrink", "mental", "schizophrenia" and "attention deficit disorder" may all be considered sufficient or necessary for this topic. However, the words "shrink" and "mental" would probably be considered sufficient, but not strongly so, within the topic of psychology, inasmuch as they could also be sufficient for other topics. In contrast, the word "schizophrenia" and the phrases "attention deficit disorder" would probably be considered strongly sufficient, and perhaps necessary, within the topic of psychology. This information can be used as part of the classifying the input content.

As another example, when used as part of an undesirable content or "offsensivity detection" filter, the system can take into account the sufficiency of a word or phrase to be considered offensive, and filter an input content accordingly. Words or phrases that are sufficient or necessary for non-offensive/allowable content may unfortunately also be sufficient for necessary for undesirable or offensive/undesirable content. For example, in the topic of medicine, the word "sex" would probably be considered sufficient or necessary for this non-offensive topic. Unfortunately the word "sex" could also be sufficient or necessary for many offensive topics, which it may be desired to be filtered. The issue is perhaps more evident with a phrase such as "breast cancer", which is clearly sufficient (and most likely necessary) for the non-offensive topic of medicine, and is most likely not sufficient or necessary for any offensive topic. However, the word "breast" could, by itself, be sufficient for both non-offensive and offensive topics, and a purely statistical system may have difficulty filtering such content without generating many false positives. Using the above techniques, the semantics of the phrase, together with the other factors such as its strength or entropy, can be used as part of the input processing (including by replacing or optionally supplementing a statistical reference/lookup), to provide more accurate results.

The present invention may be conveniently implemented using one or more conventional general purpose or specialized digital computers or microprocessors programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system that uses a combination of semantic and statistical processing of input or data content, comprising:
   a system including a computer having a processor and memory that receives an input in the form of a user-entered search query, a set of text retrieved by an automated robot process, web page, electronic document, or some other form of input;
   a semantically-enhanced statistical lookup data, which is created by analysis of a plurality of documents on various topics, to determine sufficient and necessary keyphrases, wherein a keyphrase is considered sufficient for a particular topic when if that keyphrase is found in the input, the input is likely to be in that topic, and a keyphrase is considered necessary for a particular topic when, if that keyphrase is found in the input, the input is both very likely to be in that topic, and very unlikely to be in any other topic;
   a semantically-enhanced comparison logic which uses the information in the semantically-enhanced statistical lookup data to analyze the input, compare search words in the input with keyphrases, determine an appropriate topic, and generate an appropriate output; and
   wherein keyphrases have an entropy associated therewith, wherein keyphrases that are sufficient for a particular topic have a relatively lower entropy than keyphrases that are sufficient for several topics, and a relatively higher entropy than keyphrases that are necessary for the particular topic; and
   wherein for a particular topic, the set of necessary keyphrases are a subset of sufficient keyphrases for that topic.

2. The system of claim 1, wherein some sets of keyphrases can be considered sufficient for more than one topic.

3. The system of claim 1, wherein the semantically-enhanced statistical lookup data includes a plurality of entries, including for each of a plurality of topics a plurality of keyphrases associated with that topic, together with an indication or factor as to whether that keyphrase is sufficient and whether that keyphrase is necessary, and optionally an indication or factor as to the keyphrase's entropy.

4. The system of claim 3, wherein the sufficient, necessary and entropy factors can be simple Boolean (on/off) values, or alternatively, the factors can include a weighting or a scaled value between 0 and 1 for each topic, and the system can be configured to understand that particular values are indicative of the phrase being, necessary, sufficient, or of higher or lower entropy.

5. The system of claim 1, wherein the system is configured to filter an input content by detecting if a word or phrase is considered offensive for the determined topic.

6. The system of claim 1, wherein the semantically-enhanced comparison logic determines an indication of the relevancy of the input to a topic by performing the following calculation:
   for each word in the input performing:
   for each topic summating for all the words in the input:
      a product of:
         a. the number of times each word appears in the input;
         b. a measure of the strength of the word in serving as an indicator for a particular topic;
         c. the entropy of the word; and
         d. a factor indicating a level of the word being sufficient or necessary for the topic.

7. A computer-based method of using a combination of semantic and statistical processing of input or data content, comprising the steps of:
   receiving an input in the form of a user-entered search query, a set of text retrieved by an automated robot process, web page, electronic document, or some other form of input;
   accessing a semantically-enhanced statistical lookup data, which is created by analysis of a plurality of documents on various topics, to determine sufficient and necessary keyphrases, wherein a keyphrase is considered sufficient for a particular topic when if that keyphrase is found in the input, the input is likely to be in that topic, and a keyphrase is considered necessary for a particular topic when, if that keyphrase is found in the input, the input is both very likely to be in that topic, and very unlikely to be in any other topic;
   using the information in the semantically-enhanced statistical lookup data by a semantically-enhanced comparison logic to analyze the input, compare search words in the input with keyphrases, determine an appropriate topic, and generate an appropriate output; and
   wherein keyphrases have an entropy associated therewith, wherein keyphrases that are sufficient for a particular topic have a relatively lower entropy than keyphrases that are sufficient for several topics, and a relatively higher entropy than keyphrases that are necessary for the particular topic; and
   wherein for a particular topic, the set of necessary keyphrases are a subset of sufficient keyphrases for that topic.

8. The computer-based method of claim 7, wherein some sets of keyphrases can be considered sufficient for more than one topic.

9. The computer-based method of claim 7, wherein the semantically-enhanced statistical lookup data includes a plurality of entries, including for each of a plurality of topics a plurality of keyphrases associated with that topic, together with an indication or factor as to whether that keyphrase is sufficient and whether that keyphrase is necessary, and optionally an indication or factor as to the keyphrase's entropy.

10. The computer-based method of claim 9, wherein the sufficient, necessary and entropy factors can be simple Boolean (on/off) values, or alternatively, the factors can include a weighting or a scaled value between 0 and 1 for each topic, and the system can be configured to understand that particular values are indicative of the phrase being, necessary, sufficient, or of higher or lower entropy.

11. The method of claim 7, wherein the semantically-enhanced comparison logic determines an indication of the relevancy of the input to a topic by performing the following calculation:
   for each word in the input performing:
   for each topic summating for all the words in the input:
      a product of:
         a. the number of times each word appears in the input;
         b. a measure of the strength of the word in serving as an indicator for a particular topic;
         c. the entropy of the word; and
         d. a factor indicating a level of the word being sufficient or necessary for the topic.

12. A non-transitory computer readable medium, including instructions stored thereon which when read and executed by one or more computers cause the one or more computers to perform the steps comprising:

receiving an input in the form of a user-entered search query, a set of text retrieved by an automated robot process, web page, electronic document, or some other form of input;

accessing a semantically-enhanced statistical lookup data, which is created by analysis of a plurality of documents on various topics, to determine sufficient and necessary keyphrases, wherein a keyphrase is considered sufficient for a particular topic when if that keyphrase is found in the input, the input is likely to be in that topic, and a keyphrase is considered necessary for a particular topic when, if that keyphrase is found in the input, the input is both very likely to be in that topic, and very unlikely to be in any other topic;

using the information in the semantically-enhanced statistical lookup data by a semantically-enhanced comparison logic to analyze the input, compare search words in the input with keyphrases, determine an appropriate topic, and generate an appropriate output; and wherein keyphrases have an entropy associated therewith, wherein keyphrases that are sufficient for a particular topic have a relatively lower entropy than keyphrases that are sufficient for several topics, and a relatively higher entropy than keyphrases that are necessary for the particular topic; and wherein for a particular topic, the set of necessary keyphrases are a subset of sufficient keyphrases for that topic.

13. The non-transitory computer readable medium of claim 12, wherein some sets of keyphrases can be considered sufficient for more than one topic.

14. The non-transitory computer readable medium of claim 12, wherein the semantically-enhanced statistical lookup data includes a plurality of entries, including for each of a plurality of topics a plurality of keyphrases associated with that topic, together with an indication or factor as to whether that keyphrase is sufficient and whether that keyphrase is necessary, and optionally an indication or factor as to the keyphrase's entropy.

15. The non-transitory computer readable medium of claim 14, wherein the sufficient, necessary and entropy factors can be simple Boolean (on/off) values, or alternatively, the factors can include a weighting or a scaled value between 0 and 1 for each topic, and the system can be configured to understand that particular values are indicative of the phrase being, necessary, sufficient, or of higher or lower entropy.

16. The non-transitory computer readable medium of claim 12, wherein the semantically-enhanced comparison logic determines an indication of the relevancy of the input to a topic by performing the following calculation:

for each word in the input performing:
for each topic summating for all the words in the input:
a product of:
a. the number of times each word appears in the input;
b. a measure of the strength of the word in serving as an indicator for a particular topic;
c. the entropy of the word; and
d. a factor indicating a level of the word being sufficient or necessary for the topic.

* * * * *